June 14, 1966  S. A. GRAY  3,255,850
SHOCK DAMPING AS FOR VEHICULAR SUSPENSION SYSTEMS
Filed March 23, 1964
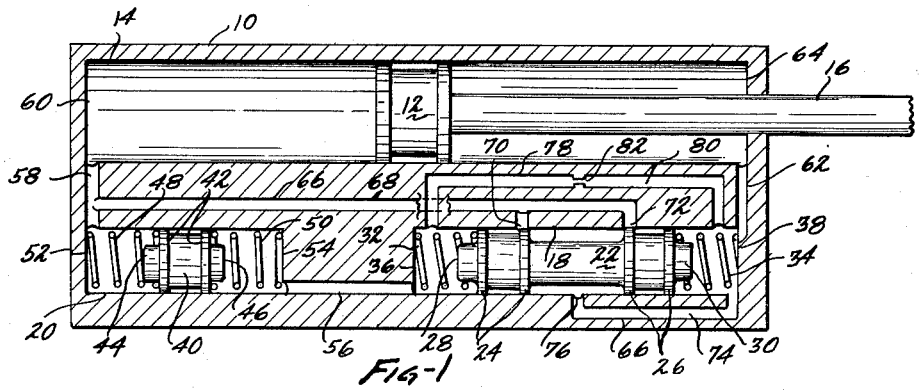
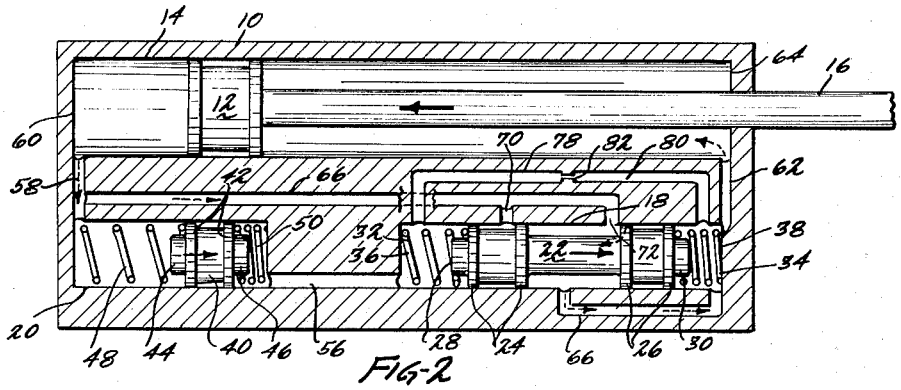
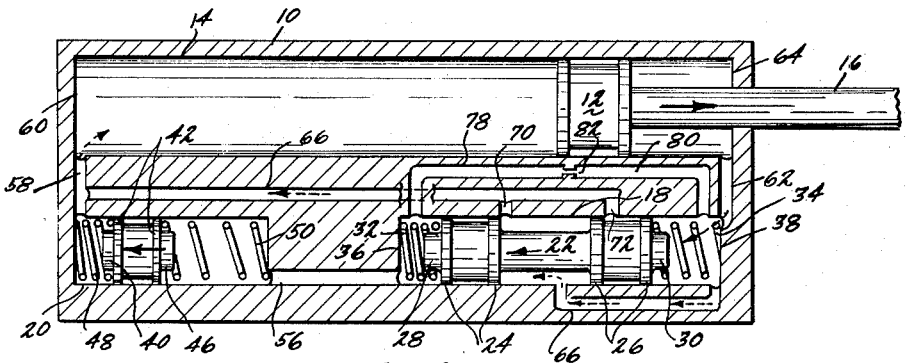
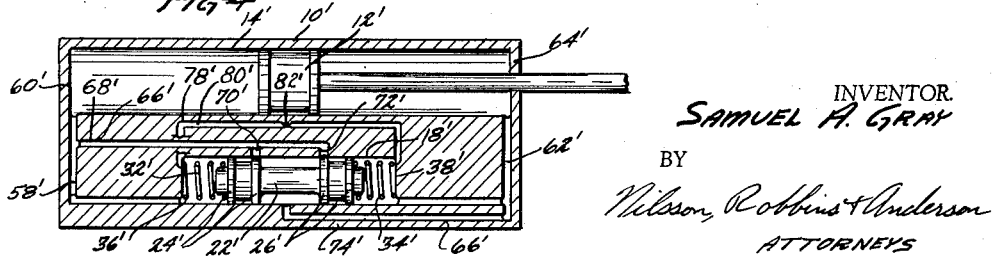
INVENTOR.
SAMUEL A. GRAY
BY
Nilsson, Robbins & Anderson
ATTORNEYS

United States Patent Office 3,255,850
Patented June 14, 1966

3,255,850
SHOCK DAMPING AS FOR VEHICULAR
SUSPENSION SYSTEMS
Samuel A. Gray, North Hollywood, Calif., assignor to
Bell Aerospace Corporation, a corporation of Delaware
Filed Mar. 23, 1964, Ser. No. 353,993
10 Claims. (Cl. 188—97)

This invention relates generally to damping oscillations and transients and other relative movements in mechanical systems and more particularly to a method and apparatus for damping such motion with a stiffness which is dynamically variable for automatic adaptability to different conditions.

Although the present invention finds particularly useful application in the field of automobile shock absorbers, and although much of the following discussion, for clarity and brevity, is directed to such examples, it is to be understood that the invention is not limited thereto. It will be apparent to those skilled in the art for example that the invention applies with like advantages to other mechanical systems wherein the energy of transient or oscillatory relative movement between different bodies is to be absorbed and dissipated. Such examples include stationary or vehicular machinery as well as systems designed expressly for shock isolating a body or capsule from its surrounding environment.

It should further be understood that such shock or vibration isolating systems generally include an effectively elastic suspension system which, while permitting one body to float with respect to another, in inherently an energy storage, resilient device and therefore permissive of oscillatory suspension as opposed to being an energy absorbing device and therefore damping in character. Generally, damping apparatus is coupled in parallel with the "spring" suspension devices with the two, as subsystems, being designed more or less independently of each other. In this connection it is to be noted that the primary objects of the present invention are directed to movement damping substantially irrespective, otherwise, of the type or character of any associated suspension devices.

In the example of automotive suspension systems, there are three chief categories of motion to damp: (1) the pitch and bounce of the sprung (that is spring supported) body which is generally of the order of one cycle per second, depending upon the mass of the body and restoring force of the spring; (2) oscillations of the unsprung mass which is normally of the order of ten cycles per second; and (3) driven transient type motion of the unsprung mass in the compression stroke of the suspension system due to impulse forces from the road.

If the automobile is to be properly designed for safety and comfort, all of these movements, extending over a wide frequency spectrum, must be damped. Furthermore when the automobile is operated on smooth roads or boulevards, the damping should be abrupt or stiff, in order to assure good cornering and stability. However, when operated on rough roads, the damping should be, ideally, relatively much "softer" to provide a comfortable ride.

Accordingly it is an important object of the present invention to provide a method and system for motion damping which provides an automatically and dynamically adjustable stiffness, thus adapting the suspension system of the automobile to excellent operation whether being driven over smooth highways and boulevards or over rough roads or fields.

The use of damping devices for absorbing the energy of the above-described types of motion is many decades old. In early automobiles for example the friction between leaves in the leaf-spring suspension system automatically provided significant damping. Later other types of dry friction devices were developed and, in more recent years, the springs have been made as frictionless as possible, while the shock absorber independently has been designed to provide the necessary damping thusly to achieve a freedom of design between the two subsystems so as to permit the optimization, as far as possible, of each. The disadvantages of dry friction devices whether of the character inherent in the spring itself or as an auxiliary shock absorber type of device, viz. erratic performance due to static versus dynamic coefficients of friction, and dirt, moisture or wear on the frictional surfaces, has caused the abandonment in large measure of such devices in favor of hydraulic shock absorbers.

The latter type of absorber is generally of the character including a piston coupled to one body and slidingly fitted within a cylinder affixed to the other body. The cylinder on both sides of the piston is filled with hydraulic fluid which can be driven, by the action of the piston, from one side to the other through a restrictive bypass orifice. The "stiffness" of the resistance to the motion between piston and cylinder depends upon the effective size of the orifice; and in accordance with prior art techniques, the size of the orifice is typically chosen as a deliberate comprise between that which is well suited for rough roads versus that which would be ideal for boulevard travel. Furthermore, the orifice size thusly compromised permits two much bypass flow at low frequency movements; that is, it lacks "resistance" or "friction" at slow piston velocities. This causes the sprung body of the automobile to oscillatingly "float" when driving at high velocity over slowly undulating highway surfaces and is annoying, dangerous, and fatiguing during long trips. A further disadvantage of the prior art hydraulic shock absorbers is that since they are not adjustable in the magnitude of bypass flow, their stiffness varies significantly with temperature due to the dependence of the fluid viscosity thereon.

Accordingly it is an additional object of the present invention to provide an automobile shock absorber which is not subject to the above and other disadvantages of the prior art.

It is another object of the present invention to provide such a shock absorber which is automatically variable in its effective bypass orifice size.

It is another object to provide such hydraulic motion damper, the stiffness of which is relatively independent of temperature.

It is another object to provide such a motion damper which is mechanically compact, simple, rugged, dependable, and durable, and which is relatively inexpensive to manufacture.

It is another object to provide such a shock absorber which is smooth and quiet in its action, while being exceedingly stiff for absorbing slow movement and relatively soft for abrupt and fast movement.

It is another object to provide such a shock absorber which is a permanently sealed hydraulic system which does not require an external source of pressurized fluid.

Briefly in accordance with the structural aspects of one example of the invention these and other objects are achieved in a combination including a driving piston which may be connected to the unsprung portion such as the wheels and axle of an automobile and which is slidingly housed within a first cylinder which is carried by the spring suspended body of the automobile. The cylinder is formed within a compact housing which also includes a second control cylinder. The opposite ends of the control cylinders are coupled respectively to the opposite ends of the first cylinder. Thusly the control cylinder forms a loop in series with the first cylinder. A spool valve arrangement disposed within the control cylinder, under quiescent conditions closes the loop and causes the driving piston to be stiffly held against axial movement. The control cylinder is bypassed, however, by a highly restrictive, pressure differential sensing loop. The sensing loop flow is relatively minute and does not directly permit rapid or abrupt axial movement of the piston. The sensing loop does however function in a manner to generate a hydraulic signal proportional to the time derivative of the pressure on opposite sides of the driving piston. The differential signal is utilized to actuate the valve apparatus in a manner to open the loop which bypasses the driving piston in the first cylinder; thusly opening the low resistance bypass loop, as when a strong impulse is applied to the driving piston, and causes the reaction to piston motion to be relatively soft. After the transient or step function in the pressure difference between the opposite ends of the first cylinder has subsided or become constant, the differential pressure signal across the sensing loop decreases, and the valve apparatus closes, thereby again stiffening the reaction to the piston motion.

In this manner, the shock absorber system is exceedingly stiff for small or slow variations in the axial displacement of the driving piston, namely when operating over boulevards or smooth highways, but relatively soft when the piston motion tends to be abrupt or large in amplitude as when operating over rough surfaces.

Further details of these and other novel features and their operation as well as additional objects and advantages of the invention will become apparent and be best understood from a consideration of the following description taken in connection with the accompanying drawing which is presented by way of an illustrative example only and in which:

FIG. 1 is a longitudinal sectional view of an example of shock damping apparatus constructed in accordance with the principles of the present invention;

FIG. 2 and FIG. 3 are similar views of the same example of the invention illustrated different dynamic operating conditions associated therewith; and FIG. 4 is a sectional view of an alternative example of the invention.

With specific reference now to the figures in detail, it is stressed that the particulars shown are by way of example and for purposes of illustrative discussion only and are presented in the cause of providing what is believed to be the most useful and readily understood description of the principles and structural concepts of the invention. Further in this regard, no attempt is made to show structural details of the apparatus in more detail than is necessary for a fundamental understanding of the invention, the description taken with the drawing making apparent to those skilled in the art how the several forms of the invention may be embodied in practice. In particular the detailed showing is not to be taken as a limitation upon the scope of the invention which is defined rather by the appended claims forming, along with the drawing, a part of this specification.

Referring to FIG. 1 an example of the invention in the form of a shock absorber for automobiles is illustrated and is seen to include a housing body 10 which may in a practical example be affixed rigidly to the body of the automobile, that is the sprung portion of the automobile. A driving piston 12 is axially slidingly disposed within a cylinder 14 formed within the housing body 10 as a machine bore and affixed rigidly to a shaft 16 which may be pivotally connected to the unsprung portions of the automobile such as the wheels and axle, not shown. The spool shaped driving piston 12 of the character and is machined in a manner with respect to the bore of the cylinder 14 to form in cooperation therewith a substantially fluid tight seal with respect to hydraulic fluid which may be carried within the cylinder 14, so that axial force exerted on the piston 12 through the shaft 16 results in a differential pressure between the opposite faces of the piston 12.

While the cylinder 14 may be referred to as the main bore formed within the housing body 10, there are also provided therein a control bore 18 and a third bore 20 the purpose and operation of which is discussed below. Disposed within the control bore 18 is an axially movable spool type control valve 22 which includes a pair of axially spaced sets 24, 26 of annular lands which form in cooperation with the inner cylindrical surface of the control bore 18 a double ridged fluid seal at each end of the valve 22. Each end of the spool valve 22 is further formed to define a spring retaining shoulder 28, 30, respectively. Interposed between each of the ends of the control bore 18 is, respectively, a positioning spring 32, 34, the positioning spring 32 being retained in slight axial compression between the retaining shoulder 28 on the spool valve 22 and an end 36 of the control bore 18, while the positioning spring 34 is similarly compressively retained between the shoulder 30 and an end 38 of the control bore 18. The positioning springs 32, 34 are preferably chosen to be substantially identical in both geometric and spring constant parameters to that, under quiescent conditions, the spool type control valve 22 is substantially centrally positioned axially in the bore 18. The actual displacement of the valve 22 is determined by Hooke's law with respect to the effective combined spring constant and the hydraulic forces impressed upon the piston surfaces of the control valve 22.

Disposed similarly within the bore 20 is a spool type sealing member 40 having a set of annular lands 42 in axial sliding engagement with the inner cylindrical surface of the bore 20 and having a spring retaining shoulder 44, 46 formed on the opposite piston faces thereof. Positioning springs 48, 50, in slight axial compression, are disposed respectively between the retaining shoulder 44 and an end 52 of the bore 20, and between the retaining shoulder 46 and an end 54 of the bore 20. As in the previously discussed portion of the system, the spool type member 40 is axially substantially centrally positioned in the bore 20 through the action of the retaining springs 48, 50 which are preferably identical springs. It is pointed out that the axial elongation of the retaining shoulders 44, 46 as well as of retaining shoulders 28, 30, function in a manner to protect the retaining springs from nonelastic compression when the valve members are forcibly or abruptly impacted against the ends of the bores 20 or 18. Additionally this form of the end of the spool type member permits the flow of hydraulic fluid through an output duct in or near the end of the bores even though the spool type member is being held against that end by applied hydraulic pressure.

The housing body 10 is in this example further bored and machined to form a bore linking duct 56 between the end 36 of the bore 18 and the end 54 of the bore 20. Similarly a passageway 58 is formed between the end 52 of the bore 20 and an end 60 of the main bore or cylinder 14 while a passageway 62 connects the end 38 of the bore 18 to an end 64 of the cylinder 14.

A fluid communication between the ends 60, 64, that is between passageways 58, 62, is provided by a bypass network 66 which includes a duct 68 communicating with the passageway 58 at one end and with a pair of duct outlets 70, 72 in the cylindrical wall of the bore 18. These outlets are axially spaced from each other and are disposed substantially equidistant from the axial center of the bore 18 and are normally closed by the spool shaped ends of the axially movable spool control valve 22. A remainder portion of the bypass network 66 consists of a duct 74 which provides hydraulic communication between the end 38 of the spool 18, that is the passageway 62 or the end 64 of the main cylinder 14, and a duct outlet 76 in the cylindrical wall of the bore 18 at or near its axial center.

A pressure differential sensing loop 78 is connected across the ends of the control bore 18 and, in this example, consists of a bypass duct 80 and a restrictive orifice 82. The restrictive orifice 82 may in other examples of the invention be constructed in a different form. However, the function of the orifice is to provide a small, restricted flow between the ends of the control bore 18 in a manner to equalize the pressures at the ends of the bore under quiescent conditions. Thus under static conditions the pressures on the opposite ends of the movable spool type control valve 22 will be equalized and the retaining springs 32, 34 will maintain the axial disposition of the movable valve 22 in its central position thereby to close the bypass network 62, 66. Accordingly under such quiescent conditions the end portions of the cylinder 14 are not bypassed, except through the restrictive orifice 82 to some extent; and the hydraulic resistance to axial movement of the driving piston 12 is exceedingly stiff. Thus when the automobile is operating over relatively smooth roads or slowly undulating pavement variations, the suspension system of the automobile is caused to be very stiff, thus precluding high speed "floating" and providing greater stability and cornering capabilities.

It should be noted that while the axial displacement of the axially movable spool type control valve 22 is, under static conditions, centrally disposed in the control bore 18, the axial disposition of the spool type sealing member 40 is displaced from center by an axial distance proportional to the quiescent pressure difference between that in the passageway 58 as compared to that in the passageway 62 due to the quiescent equalizing communication through the restrictive orifice 82. Thus the axial position of the spool member 40 is proportional to the pressure differences in the ends of the main cylinder 14 while the axial position of the control valve 22 is proportional to the time derivative of the pressure difference, the derivative being generated by the reluctance to abrupt flow through the restrictive orifice 82 in cooperation with the limited, Hooke's law displacement of the spool type sealing member 40. It should be noted, as will be discussed in more detail below in connection with the subsequent figures, that although the quiescent position of the control valve 22 is as shown in FIG. 1, it is driven away from its central location by the differential pressure signals applied to its opposite ends through the action of the pressure differential loop 78 when abrupt or transient pressure differences are applied to either of the passageways 58, 62.

In FIG. 2 the shock absorber is shown in a non-quiescent state of operation caused by an abrupt impulse force to the left, as viewed in the drawing, of the shaft 16 which as indicated by the arrow is depicted as driving the piston 12 abruptly to the left along the interior of the cyilnder 14. This action causes an abrupt pressure increase in the passageway 58 accompanied by a similar decrease in the hydraulic pressure in the passageway 62 in a push-pull manner of operation. The increased pressure in the passageway 58 drives the spool type sealing member 40 to the right in the bore 20 until the increasing resistance to further compression of the spring 50 precludes its further travel in that direction. This action of the member 40 against the positioning springs in the bore 20 cause an abrupt increase in the pressure in the lefthand end 36 of the control bore 18 due to the hydraulic communication provided by the duct 56. Thus there is generated across the pressure differential sensing loop 78, a pressure difference signal which drives the control valve 22 to the right as shown by the arrow in the figure. This motion of the control valve opens the bypass network 66 as shown and permits a low reluctance flow of hydraulic fluid between the opposite ends of the main cylinder 14 as shown by the dotted arrows in the figure. Thus, it is shown, that when an abrupt force to the left is impressed upon the driving piston 12, the resulting transient hydraulic differential pressures actuate the control valve 22 to open the bypass network thereby providing a relatively soft resistance to such action by shaft 16. Thus when the automobile is operating on rough roads or cross country circumstances, the shock absorber is exceedingly soft to provide the most comfortable ride for passengers and the safest for cargo and vehicle.

In FIG. 3 the apparatus is illustrated as dynamically in action under the influence of an abrupt impulse force to the right as applied to the piston 12 through the shaft 16. Similarly to before, the spool type sealing member 40 and its positioning springs in cooperation with the pressure differential sensing loop 78 generate a pressure signal which drives the control valve 22 to the left as shown in the figure, thereby opening the bypass network 66 and consequently providing a low resistance to abrupt action to the right, similarly to that to the left as shown and discussed in connection with FIG. 2. Note however that under the conditions illustrated in FIG. 3, the direction of the flow of the hydraulic fluid between the ends of the main cylinder 14 is in the opposite direction as indicated by the dotted arrows.

Referring to FIG. 4, an alternative example of the invention is illustrated which is similar in most respects to the example of the previous figures. For clarity, the reference numerals are primed and may be readily referred to their analogous, unprimed counterpart in the previous figures. In this manner, then, a housing body 10' is shown in which are provided a cylinder 14' and a driving piston 12'. Similarly a control bore 18' may be provided, as shown, within the housing body 10'. A spool control valve 22' having a pair of axially spaced sets 24', 26' of annular lands formed near either end thereof is disposed axially slidingly within the control bore 18'. A positioning spring 32', 34', respectively, is interposed between the valve 22' and the ends 36', 38' of the bore 18'.

A passageway 58' is formed to provide fluid communication between the end 60' of the cylinder 14' and the end 36' of the control bore, and a passageway 62' is provided, as shown, between the end 64' of the cylinder 14' and the end 38' of the control bore.

A bypass network 66' also provides a path of communication between the opposite ends of the cylinder 14'. The network 66' includes a duct 68' communicating between the passageway 58' and a pair of outlets 70', 72' in the cylindrical wall of the control bore 14' which are normally closed by the centrally positioned spool valve 22'. The bypass network also includes a duct 74' connecting between the passageway 62' and approximately the center of the control bore 18'.

A sensing loop 78' including a bypass duct 80' and a restrictive orifice 82' in series therewith is provided between the ends 36', 38' of the control bore 18'. The operation of the loop 78' as well as that of the overall system is in principle similar to that of the previous example discussed in detail above and need not, therefore, be repeated here.

There has thus been disclosed and described an example of motion damping apparatus and method which achieves the objects and exhibits the advantages enumerated and discussed hereinabove.

What is claimed is:
1. Motion damping system comprising:
   a housing body having formed therein main and control bores each having first and second ends;
   a driving piston axially slidingly disposed in said main bore;
   hydraulic bypass bore coupled between said first and second ends of said main bore, said control bore being hydraulically interposed in said bypass bore;

piston valve means disposed axially slidingly within said control bore for substantially closing said bypass bore during predetermined quiescent conditions;

pressure change sensing loop coupled to said first and second ends of said control bore for generating thereacross a hydraulic signal substantially proportional to the time derivative of the pressure difference between opposite ends of said main bore;

said piston valve means being adapted to move axially in response to said hydraulic signal thereby opening said bypass loop when the time rate of change of said pressure difference is relatively high;

said housing body being formed further to define a third bore having first and second ends;

first means for providing hydraulic communication between said first end of said main bore and said first end of said third bore;

second means for providing hydraulic communication between said control bore and said second end of said third bore; and spring-loaded equalizing spool axially slidingly disposed within said third bore.

2. A vehicular shock absorber of the character including a dynamically variable hydraulic fluid bypass comprising:

a housing body formed to define a main bore and a control bore and first and second passageways communicating between said main and control bores;

first means carried by said housing body and movable therewithin in response to any difference in fluid pressure between said first and second passageways;

second means disposed axially slidingly movable within said control bore;

a bypass passageway communicating with said first and second passageways for diverting fluid pressure therebetween, said bypass passageway being closed by said second means during steady state application of pressure between said first and second passageways;

and differentiating means communicating with said first and second means for moving said second means only in response to changes in fluid pressure between said first and second passageways thereby to open said bypass passageway by an amount proportional to the time rate of change of said fluid pressure.

3. The invention according to claim 2 in which said first means is a movable valve communicating directly with said first passageway and through said differentiating means with said second passageway.

4. The invention according to claim 3 in which said second means is a movable valve communicating directly with said second passageway.

5. The invention according to claim 3 in which said second means is a movable valve and said differentiating means is an equalizing passageway communicating with each end of said control bore and having a restricted orifice therein.

6. A shock absorber for vehicles including a variable orifice bypass loop between the ends of the driven piston and comprising:

a housing formed to define first and second passageways and a first bore communicating with said first passageway and a second bore communicating with said second passageway;

a first spool valve movably disposed within said first bore;

a second spool valve movably disposed within said second bore;

said housing further defining a communicating passageway therewithin between said first and second bores and a bypass passageway communicating with said first and second passageways for diverting fluid pressure between said first and second passageways, said bypass passageway being closed by said second spool valve during quiescent application of pressure differences between that of said first and that of said second passageways; and differentiating means communicating with said second passageway and said first bore for generating a hydraulic signal for moving said second spool valve only in response to change in the fluid pressure between said first and second passageways thereby to open said bypass passageway by an amount proportional to the time rate of change of said fluid pressure difference.

7. The invention according to claim 6 in which said differentiating means includes a passageway communicating with each end of said second bore on each side of said second spool valve and which has a restricted orifice therein.

8. The invention according to claim 7 in which said second spool valve is bilaterally springloaded thereby to be disposed substantially centrally of said second bore in the absence of changes in pressure between those of said first and second passageways thereby to maintain said bypass passageway closed.

9. The invention according to claim 8 in which said first spool valve is bilaterally springloaded and assumes a position within said first bore during quiescent fluid pressure conditions within said first and second passageways which is proportional to the difference in fluid pressure between said first and second passageways and the effective spring constant of said springloading.

10. A hydraulic shock absorber for automobiles having a dynamically automatically varying stiffness and comprising:

a housing formed to define first, second, third, bypass, and equalizing passageways therewithin;

first spool valve means movably disposed within said housing and having one end thereof communicating with said first passageway;

second spool valve means movably disposed within said housing and having one end thereof communicating with said second passageway;

said third passageway communicating with the opposite ends of said spool valve means, said bypass passageway communicating with said first and second passageways and being closed by said second spool valve means during quiescent application of pressure differences between those of said first and second passageways, and said equalizing passageway communicating with each end of said second spool valve means and having a restricted orifice therein whereby pressure changes between said first and second passageways are detected by said first spool valve means and differentiated by said restricted orifice to cause said second spool valve means to open said bypass passageway by an amount proportional to the time rate of change of the difference in pressure between that of said first and second passageways.

References Cited by the Examiner

UNITED STATES PATENTS

| 1,522,243 | 1/1925 | Hughes. | |
| 2,604,953 | 7/1952 | Campbell | 188—88 X |
| 3,106,992 | 10/1963 | Sherburne | 188—97 |

FOREIGN PATENTS 667,228  7/1963  Canada.

MILTON BUCHLER, *Primary Examiner.*

G. HALVOSA, *Assistant Examiner.*